United States Patent Office 3,523,400
Patented Aug. 11, 1970

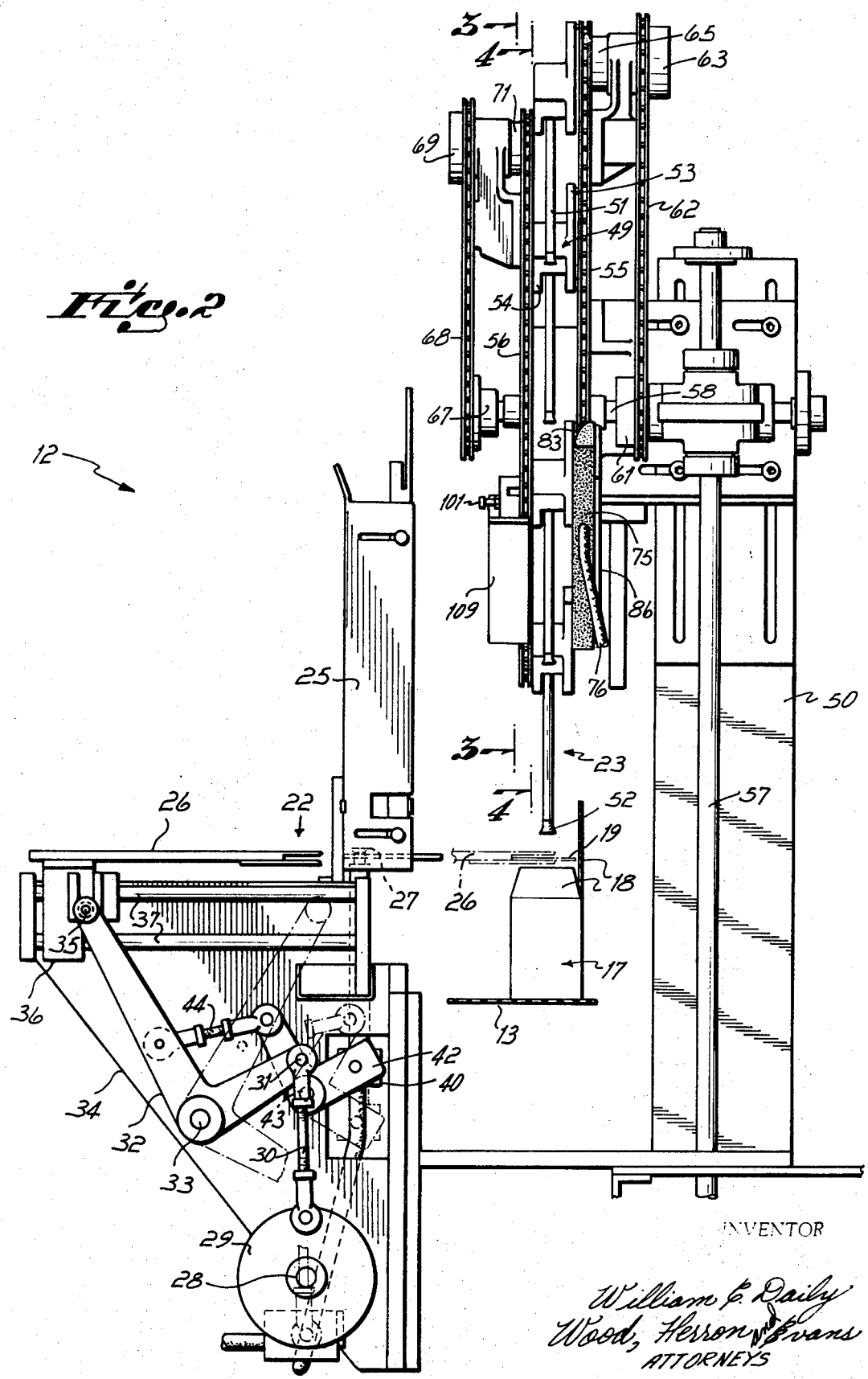

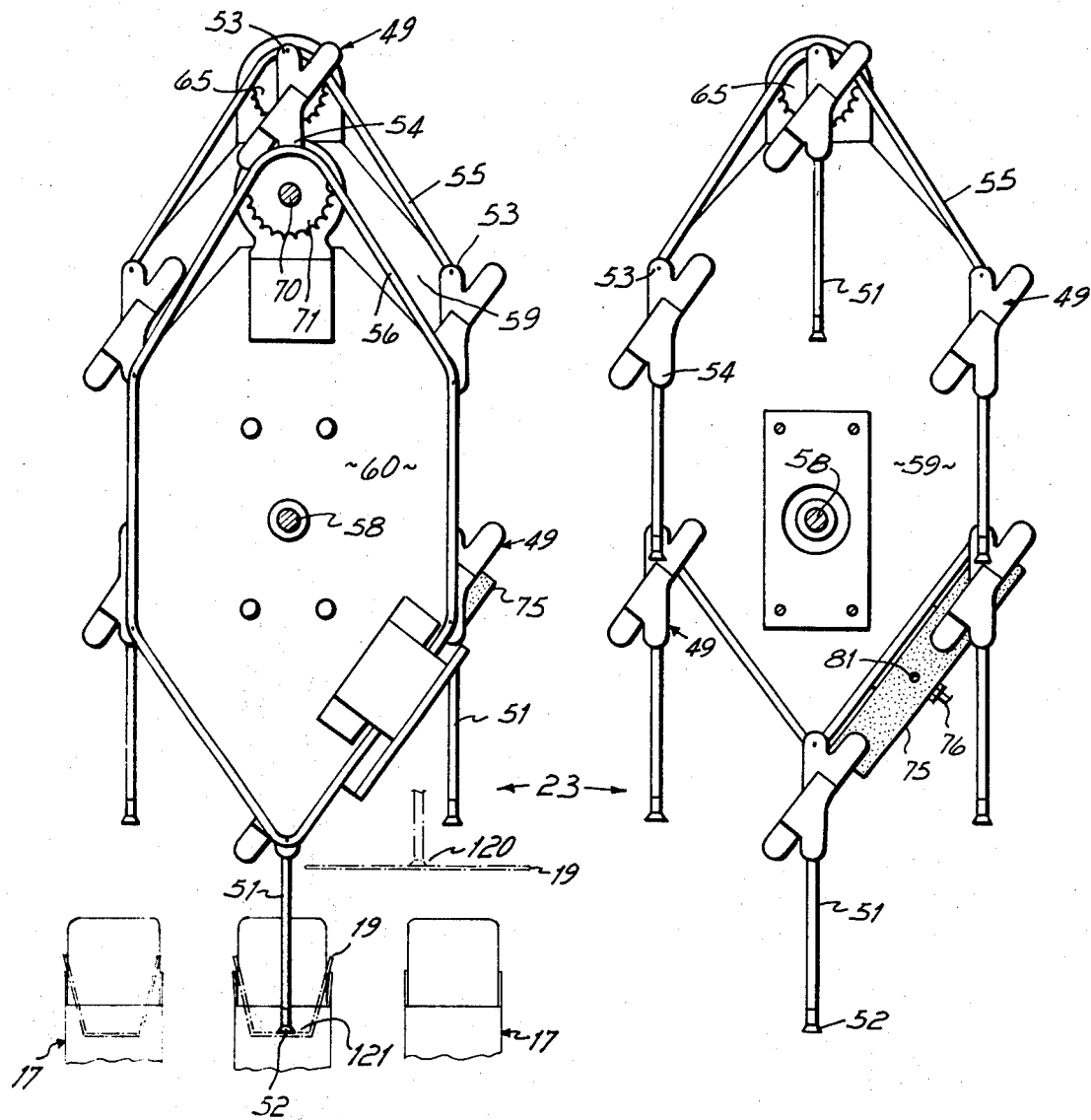

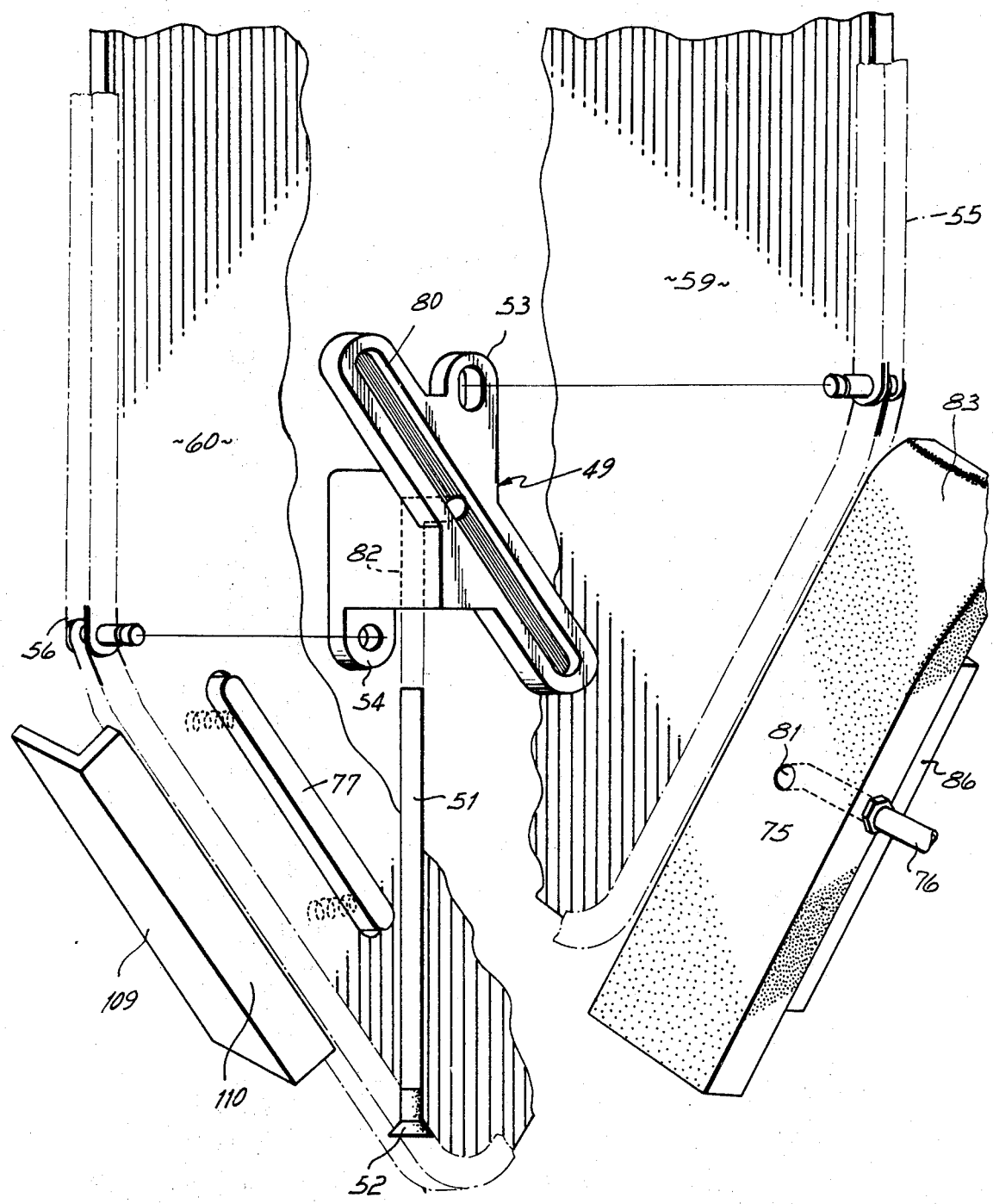

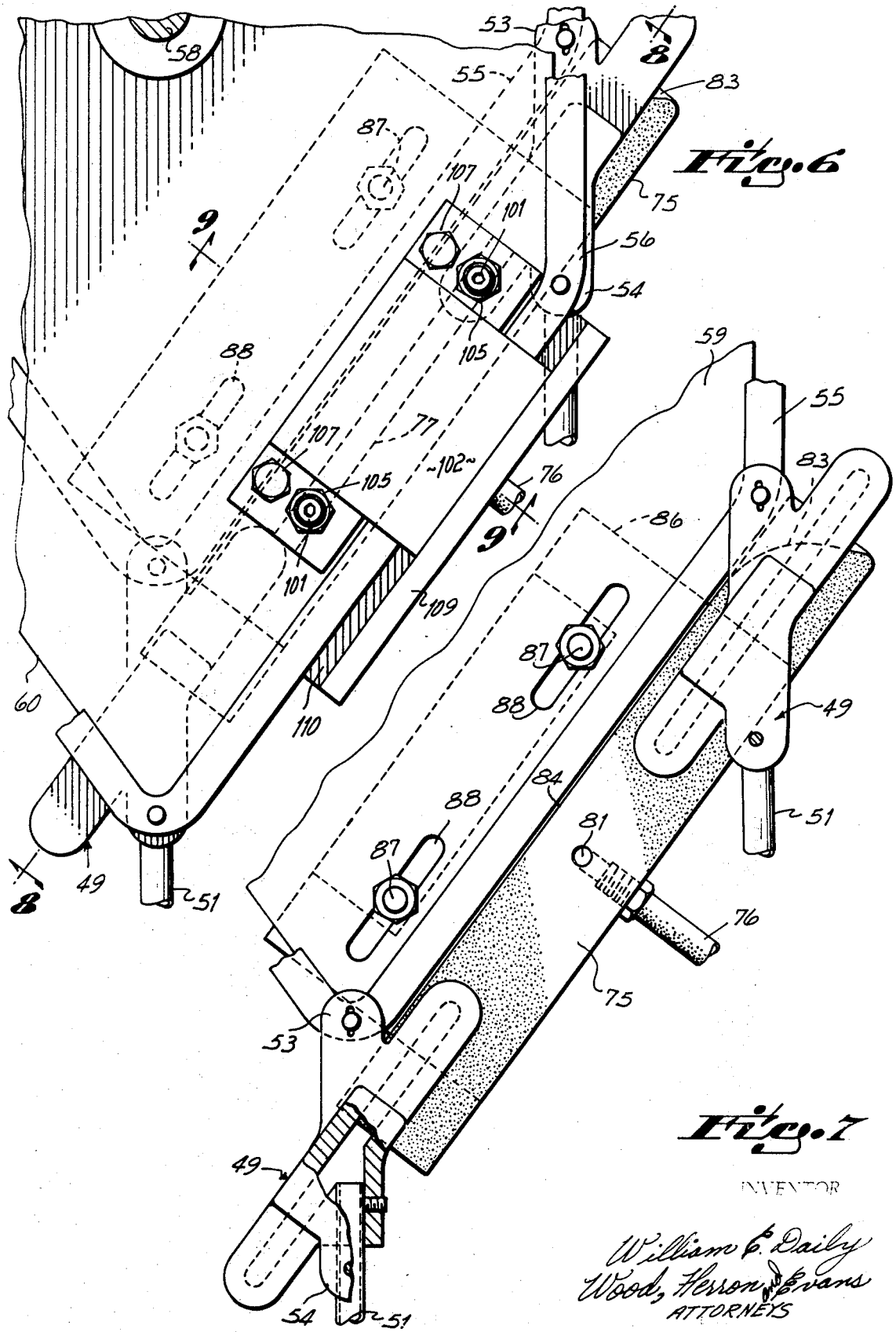

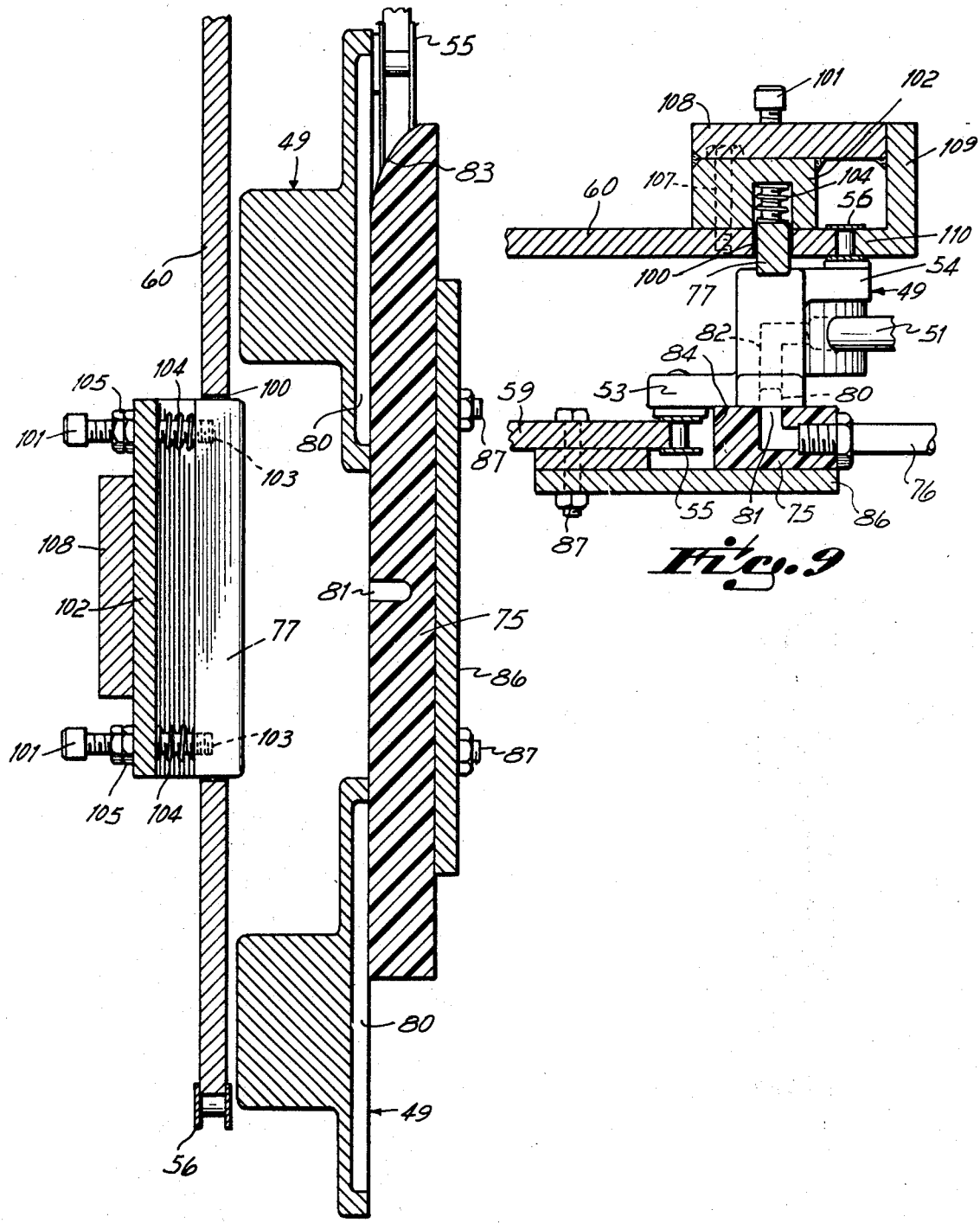

3,523,400
LEAFLET FEEDER AND INSERTER FOR CARTONERS
William C. Daily, Covington, Ky., assignor to R. A. Jones and Company, Incorporated, Covington, Ky., a corporation of Kentucky
Filed Oct. 2, 1967, Ser. No. 672,030
Int. Cl. B65b 61/20
U.S. Cl. 53—117                                              10 Claims

ABSTRACT OF THE DISCLOSURE

Apparatus for inserting leaflets into horizontally moving cartons in which each leaflet is fed from a stack to a position overlying the cartons and a trucker having a vacuum cup is moved diagonally toward and away from the cartons to engage a leaflet and thrust it into a carton while moving horizontally at the speed of the carton.

BACKGROUND OF THE INVENTION

This invention relates to cartoners, that is, apparatus which feeds flat, folded cartons from a stack in sequence onto a conveyor, erects the cartons, and presents them in an attitude to be filled either manually or automatically. The invention is particularly directed to apparatus for inserting leaflets into the open ends of the cartons prior to the insertion of the articles of merchandise into the cartons.

In automatic or semi-automatic cartoning of products, leaflets have been inserted into cartons in one of two ways. In horizontal cartoning apparatus, the products are conveyed in individual buckets toward the cartons, which are also conveyed in buckets, and are thrust from the buckets into the cartons. The leaflets are also conveyed by the product buckets and are folded over the product immediately prior to its being thrust into the carton so that the article itself conveys the leaflet into the carton.

In cartoning apparatus wherein the carton is vertically loaded, it has not proven practical to fold the leaflet over the product prior to its being inserted into the carton because of the difficulty of controlling the article as it is dropped into the carton. The leaflet is, therefore, inserted first and thereafter the article is inserted into the carton, usually manually. In such apparatus, the carton conveyor normally has an intermittent motion which permits the leaflet to be inserted by a vertically moving tucker during a pause in the movement of the carton.

The objective of the present invention is to provide apparatus for inserting leaflets vertically into cartons which are continuously moving although it should be understood that the apparatus is equally useful for inserting leaflets into cartons which are conveyed with an intermittent motion.

It has been a further objective of the invention to provide apparatus for inserting leaflets into continuously moving cartons, the appartus providing continuous control over the leaflet from the time that it leaves the stack until it is inserted into its proper position in the carton.

The objectives of the invention are attained by providing apparatus which thrusts a leaflet from a stack and holds it over the moving cartons, the leaflets thereafter being thrust into the cartons with a tucker element having a horizontal component of motion which matches the horizontal motion of the carton conveyor. In his apparatus, control over the leaflet is maintained preferably by the selective application of a vacuum to the element which engages the leaflet.

Another objective of the invention has been to provide a conveyor for a tucker element which maintains the tucker element in a vertical attitude while moving the tucker in a downward diagonal path into a carton and an upward diagonal path out of the carton. The apparatus includes means for selectively applying a vacuum to the tucker element during the period when control over the leaflet is required as it is being thrust into a carton.

A further objective of the invention has been to provide, in apparatus as described above, means for varying the timing of the application and relief of vacuum to the tucker element.

The several features of the invention will become more readily understood from the following detailed description taken in conjunction with the accompanying drawings in which:

FIG. 2 is a side elevational view of the invention;

FIG. 3 is a cross-sectional view taken along lines 3—3 of FIG. 2;

FIG. 4 is a cross-sectional view taken along lines 4—4 of FIG. 2;

FIG. 5 is a disassembled perspective view of the tucker and conveying apparatus;

FIG. 6 is an elevational view of the apparatus for applying vacuum to the tucker;

FIG. 7 is a view similar to FIG. 6 with one conveyor plate removed;

FIG. 8 is a cross-sectional view taken along lines 8—8 of FIG. 6; and

FIG. 9 is a cross-sectional view taken along lines 9—9 of FIG. 6.

Figure 1:
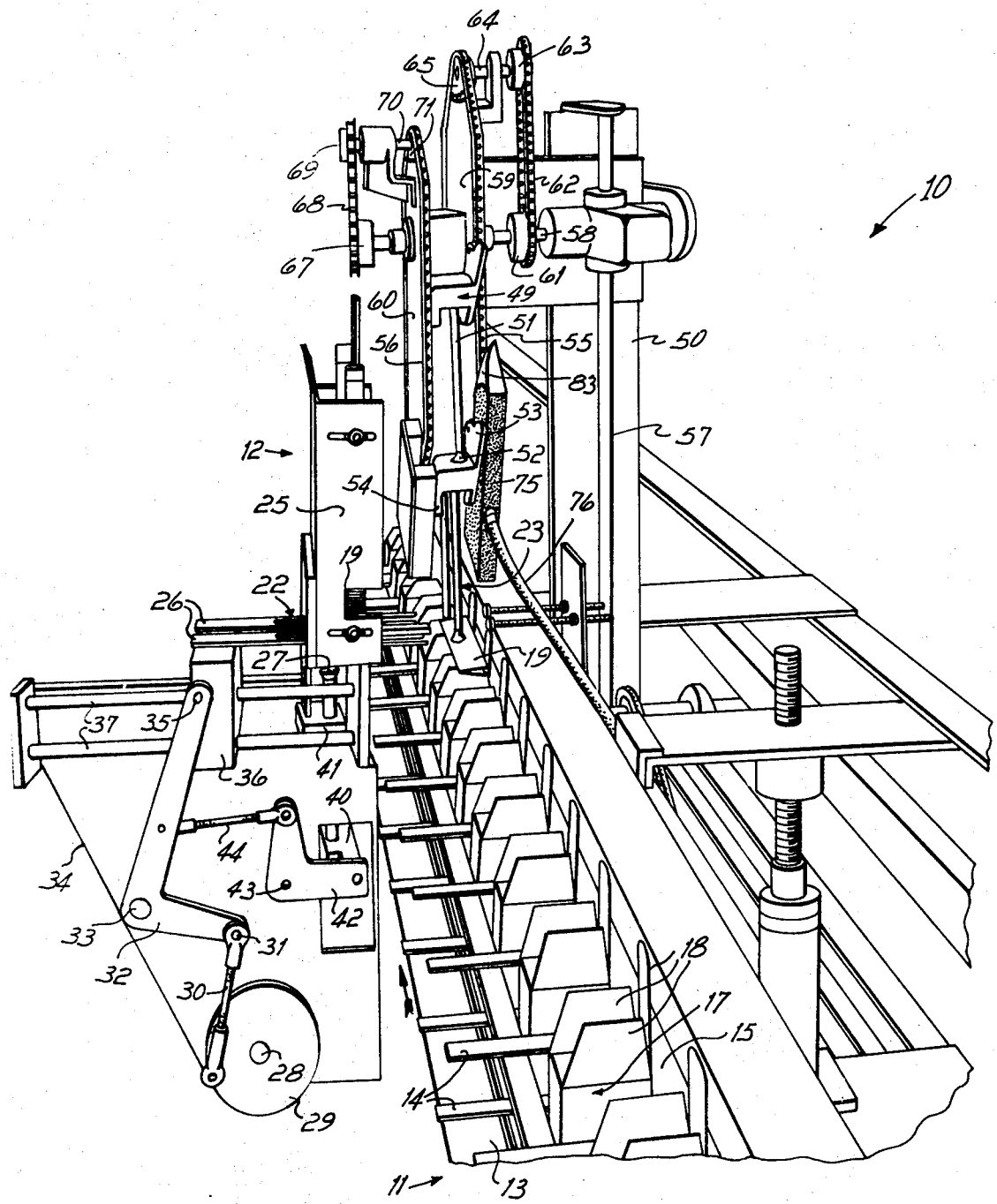
FIG. 1 is a perspective view of the leaflet feeder in association with a fragmentary view of cartoning equipment.

General organization of the cartoner and leaflet inserter

Referring to FIG. 1, the complete assembly is indicated at 10 and includes cartoning apparatus 11 and the leaflet inserter 12. The cartoning apparatus includes a conveyor 13 which moves in the direction of the arrow and includes upper and lower transverse fingers 14 which form longitudinally spaced pockets or buckets 15 each of which carries a carton 17 which is open at its upper end as indicated by its flaps 18. In the illustrated embodiment, the cartons move continuously in the direction of the arrow past the leaflet inserter 12 where they receive a leaflet 19. Immediately downstream of the leaflet inserter are loading stations wherein the products are inserted into the cartons after the cartons have received the leaflets.

The leaflet inserter includes a feeder 22 and a tucker 23. The feeder feeds leaflets from a stack into a position above the cartons as shown in FIG. 1 and the tucker picks up the leaflet from the feeder and thrusts it downwardly into the carton while moving horizontally at the speed of the carton.

The leaflet feeder

The leaflet feeder includes a hopper 25 wherein a stack of leaflets 19 is supported and from the bottom of which the leaflets are fed singly to a position overlying the cartons.

At the bottom of the hopper are two reciprocably pushers 26 which engage lateral edge portions of a leaflet and carry it from the hopper and hold it momentarily over the carton conveyor. The leaflets are drawn downwardly from the stack to a position where they can be engaged by the pushers by two suction cups 27 connected to a vacuum source not shown. The vacuum cups and pushers are mechanically operated from a drive shaft 28 to which a wheel 29 is fixed. The wheel is eccentrically connected to a link 30 which is connected at 31 to one arm of a bell crank lever 32 pivoted at 33 to the base 34 of the apparatus. The other arm of the bell crank lever is connected at 35 to a block 36 slideable on rods 37. The block carries the pushers 26 and as the block is reciprocated by the bell crank lever the pushers reciprocate.

Similarly, the suction cups 27 are carried by a block 40 and are slideable in a block 41. The block 40 is connected to a bell crank lever 42 which is pivoted at 43 to the base 34 and is connected by a link 44 to the bell crank lever 32. Thus, as the bell crank lever is reciprocated by the eccentric wheel 29, the suction cups 27 and the pushers 26 reciprocate in timed relation, the suction cups drawing the leaflets down into position for engagement with the pushers whereupon the pushers pass transversely through the hopper picking up the leaflets and carrying them to a position overlying the cartons.

Feeding apparatus of this type has been used in the feeding of folded cartons to a cartoner.

Tucking apparatus

The tucking apparatus is mounted on a post 50 and includes as its principal elements six tuckers 23, only three of the tuckers being shown in FIG. 1. Each tucker 23 has a tube 51 which has a suction cup 52 at its lower end and which is mounted at its upper end to a shoe 49. The shoe is generally "Z"-shaped having an upper leg 53 and a lower leg 54 which are connected respectively to an upper conveyor chain 55 and a lower conveyor chain 56.

The chains 55 and 56 are driven by a motor not shown which drives a vertical shaft 57 which is driveably connected to a horizontal shaft 58. The shaft 58 passes through plates 59 and 60 which form tracks about which the chains 55 and 56 respectively pass. The upper chain 55 is driven by the shaft 58 through a sprocket 61 mounted on the shaft 58, the sprocket 61 driving a chain 62 which passes over a sprocket 63 driving shaft 64 to which sprocket 65 is fixed. The sprocket 65 drives the chain 55.

The chain 56 is driven in a similar manner, the shaft 58 being connected to a sprocket 67 driving a chain 68 passing over sprocket 69 connected to a shaft 70. The shaft 70 drives a sprocket 71 which is engaged by the conveyor chain 56.

At the lower portion of the movement of the tuckers, the shoes 49 move slideably over a vacuum plate 75 supported on the plate 59 which forms the track for the upper conveyor chain. The vacuum plate is connected to a source of vacuum by hose 76. The shoe 49 is held into engagement with the vacuum plate by a pressor foot 77 which passes through the lower chain plate 60.

This particular organization of shoe, vacuum plate, and presser foot can be best understood by reference to FIGS. 5-9. The general configuration of the shoe 49 is best illustrated in FIG. 5. It is preferably a casting having an elongated slot 80 which passes over the vacuum plate 75 and is in communciation with a port 81 in the vacuum plate during its traverse of the vacuum plate. The port 81 is connected to the hose 76. The slot 80 is connected via an "L"-shaped passageway 82 to the tucker tube 51. Thus it can be seen that for the length of time that it takes the slot 80 to make a traverse of the port 81, the tucker tube 51 will be in communication with the vacuum source represented by the hose 76.

The vacuum plate 75 is preferably beveled at its upstream end 83 to provide a ramp for its engagement by the shoe 49. The vacuum plate 75 also forms a guide through its surface 84 by which the upper chain 55 is maintained in engagement with the track formed by the plate 59 (see FIG. 9). The vacuum plate is mounted on a bracket 86 which is in turn bolted through the plate 59 by bolts 87 which pass through slots 88 in the plate 59. The slots 88 permit an adjustment of the position of the vacuum plate and hence a means for adjusting the timing of the application of, or more importantly, the discontinuance of the vacuum to the tucker.

The presser foot 77 projects through a slot 100 in the lower conveyor plate 60 and is held there by adjustment screws 101 which pass slideably through a plate 102 and are threaded into the presser foot 77 as at 103. A compression spring 104 surrounds each screw 101 and urges the presser foot toward the vacuum plate 75. Each screw 101 has a pair of adjustment nuts 105 threaded on to it permitting a variation of the inward setting of the presser foot 77.

The bracket 102 is secured by bolts 107 to the plate 60. The bracket has an extension 108 which carries a flange 109 and a chain guide 110 which keeps the chain in engagement with the plate 60 during the portion of its travel on the downward diagonal or operative position.

Operation

In operation, the carton conveyor, the leaflet feeder, and the leaflet tucker are all driven from the same power source in synchronism. As the cartons move horizontally as viewed in FIGS. 1-4, a leaflet 19 is fed from the leaflet feeder 12 to a position overlying the line of cartons, the leaflets being fed in time relation to the movement of the cartons and the tuckers 23.

The tuckers make a complete cycle around their plates 59 and 60, always at a vertical attitude as determined by the connection of the shoes 49 to the respective chains 55 and 56. In the operative portion of their movement, each tucker moves diagonally downwardly during which movement it picks up a leaflet from the feeder as indicated at 120 in FIG. 3. At the time of picking up the leaflet, the port 81 in the vacuum plate 75 is in coincidence with the slot 80 in the shoe 49 thereby providing positive control of the tucker over the leaflet. The angle of the path of movement of the tucker coupled with its speed are such that the horizontal component of movement of the tucker corresponds exactly to the horizontal movement of the cartons. While retaining control over the leaflet, the tucker forces the leaflet into the carton as illustrated at 121 in FIG. 3. The position of the tucker and the leaflet as shown at 121 in FIG. 3 is the preferred depth of penetration and is shown as being the lowermost position taken by the tucker. In this position, the extremities of the leaflet project above the open end of the carton and the leaflet is held in this position by the friction of the carton walls on the surface of the leaflet. This attitude of the leaflet in the carton provides a flaring opening for the introduction of the product downstream of the leaflet inserter.

Following the introduction of the leaflet into the carton, the tucker moves in a diagonal path upwardly. Again, the angle of the path and the speed of the conveyor are correlated to the speed of the cartons so that the horizontal component of movement of the tucker corresponds exactly to the horizontal movement of the carton. Obviously it is desirable that the application of vacuum to the tucker be discontinued before the tucker moves upwardly away from the carton, and it should be observed that when the shoe 49 is in its lowermost position, it has passed beyond the port thereby venting the tucker tube 51.

What is claimed is:

1. In a cartoner having a conveyor for conveying in a lineal path a stream of cartons which are open at one end, a mechanism for inserting a leaflet into the open end of each said carton comprising, a hopper for supporting a supply of leaflets, a feeder for thrusting leaflets, one at a time, from said hopper to a position adjacent said carton conveyor, at least one elongated tucker supported perpendicular to said path and adjacent said carton conveyor, and endless conveyor means for moving said tucker past said feeder and into a carton while maintaining said perpendicular orientation of said tucker, whereby to engage a leaflet and thrust it into a carton.

2. In a cartoner according to claim 1 wherein said carton conveyor moves said cartons continuously past said inserting mechanism, said moving means comprising, means supporting a portion of said endless conveyor means adjacent said carton conveyor and defining its path of movement to impart to said tucker a lineal component of speed equal to the speed of said carton conveyor at least during the time said tucker is close to said carton conveyor, whereby, as said tucker moves into and out of a carton, it moves lineally with the carton.

3. In a cartoner having a conveyor for conveying a stream of cartons which are open at one end, a mechanism for inserting a leaflet into the open end of each said carton comprising,
 a hopper for supporting a supply of leaflets,
 a feeder for thrust leaflets, one at a time, from said hopper to a position adjacent said carton conveyor,
 at least one tucker supported adjacent said carton conveyor,
 said tucker including a tube having a vacuum cup on one end for engagement with leaflets,
 means for selectively applying a vacuum to said tube as it moves toward said conveyor, and removing said vacuum as said tube moves away from said conveyor, and
 means for moving said tucker past said feeder into a carton, whereby to engage a leaflet and thrust it into a carton.

4. In a cartoner according to claim 3, said tucker and moving means further comprising,
 a shoe connected to the other end of said tube and having a port on one surface thereof and a passageway from said port to said tube, said shoe being operably connected to said moving means,
 a vacuum plate engageable by said shoe during a portion of its movement, said plate having a port traversed by said port in said shoe,
 means for applying a vacuum to said plate in communication with its port,
 one of said ports being elongated in the direction of movement of said shoe whereby the vacuum from said applying means is applied to said tucker tube only during the period that said shoe port traverses said plate port.

5. A cartoner according to claim 4, further comprising, means for pressing said shoe against said plate at least during the period that said shoe port traverses said plate port.

6. A cartoner according to claim 4, further comprising, adjustable means for mounting said vacuum plate with respect to said shoe whereby its fixed position can be varied to permit a variation in the timing of the application and release of vacuum to said tucker.

7. In a cartoner having a conveyor for conveying a stream of cartons which are open at one end, a mechanism for inserting a leaflet into the open end of each said carton comprising,
 a hopper for supporting a supply of leaflets,
 a feeder for thrusting leaflets, one at a time, from said hopper to a position adjacent said carton conveyor,
 at least one tucker supported adjacent said carton conveyor, and
 means for moving said tucker past said feeder and into a carton, whereby to engage a leaflet and thrust it into a carton,
 said moving means comprising
  two horizontally spaced conveyor chains,
  a chain track supporting each chain, each said track having a V shape at its end adjacent said carton conveyor, and
  means for mounting said tucker between said chains.

8. In a cartoner according to claim 7 in which said chains have identical polygonal tracks which are spaced vertically as well as horizontally,
 said tucker mounting means comprising a shoe having a lower leg pivoted to the lower of said chains and and upper leg pivoted to the higher of said chains.

9. In a cartoner according to claim 8
 a vacuum plate mounted on one of said conveyor tracks and providing a port connected to a vacuum source,
 said shoe being movable past said port and having a passageway communicating at one end with said tucker and at the other end with said port.

10. In a cartoner having a conveyor including spaced buckets for horizontally conveying cartons with open upper ends, a mechanism for inserting leaflets into the open ends of said cartons comprising,
 a hopper for supporting a supply of leaflets,
 a feeder for thrusting leaflets, one at a time, from said hopper to a position overlying said carton conveyor,
 at least one elongated vertical tucker supported over said conveyor,
 endless conveyor means for moving said tucker diagonally toward said conveyor and then diagonally away from said conveyor while maintaining the vertical orientation of said tucker, the horizontal component of speed of movement of said tucker matching the speed of the conveyor.

References Cited

UNITED STATES PATENTS

| | | | |
|---|---|---|---|
| 2,057,698 | 10/1936 | Thayer | 53—120 X |
| 2,821,826 | 2/1958 | Stubblefield | 53—120 |
| 2,935,827 | 5/1960 | Burt | 53—251 X |
| 3,353,330 | 11/1967 | Bivans et al. | 53—120 X |
| 3,390,875 | 7/1968 | Beert et al. | 271—5 |

THERON E. CONDON, Primary Examiner

R. L. SPRUILL, Assistant Examiner

U.S. Cl. X.R.

53—50; 271—44

PO-1050
(5/69)

UNITED STATES PATENT OFFICE
CERTIFICATE OF CORRECTION

Patent No. 3,523,400　　　　　　　Dated August 11, 1970

Inventor(s) William C. Daily

It is certified that error appears in the above-identified patent and that said Letters Patent are hereby corrected as shown below:

Col. 1, Line 15
    "trucker" Should be --tucker--

Col. 1, Line 66
    "his" Should be --this--

Col. 2, Line 60
    "reciprocably" Should be --reciprocable--

Col. 5, Line 13
    "thrust" Should be --thrusting--

SIGNED AND
SEALED
NOV 3 1970

(SEAL)
Attest:

Edward M. Fletcher, Jr.
Attesting Officer

WILLIAM E. SCHUYLER, JR.
Commissioner of Patents